United States Patent [19]

Lee

[11] Patent Number: 4,905,585
[45] Date of Patent: Mar. 6, 1990

[54] SYSTEM FOR CLEANING SUGARBEET PULP

[75] Inventor: Benedict C. Lee, Fargo, N. Dak.

[73] Assignee: American Crystal Sugar Company, Moorhead, Minn.

[21] Appl. No.: 342,728

[22] Filed: Apr. 24, 1989

Related U.S. Application Data

[60] Continuation of Ser. No. 242,485, Sep. 9, 1988, abandoned, which is a division of Ser. No. 58,364, Jun. 4, 1987, Pat. No. 4,770,886.

[51] Int. Cl.$^4$ .............................................. A23P 1/00
[52] U.S. Cl. ...................................... 99/510; 99/484; 99/485; 99/516; 241/76
[58] Field of Search ................. 99/484, 495, 509, 510, 99/513, 516, 536, 537; 241/101 B, 76; 162/4, 99; 209/17, 12; 210/173; 127/43, 44, 48, 50

[56] References Cited

U.S. PATENT DOCUMENTS

| | | | |
|---|---|---|---|
| 2,723,199 | 11/1955 | Todd | 99/509 X |
| 3,237,768 | 3/1966 | Koch, Jr. et al. | 99/537 X |
| 3,734,773 | 5/1973 | Haley | 127/48 |
| 3,993,791 | 11/1976 | Breed et al. | 426/436 |
| 4,053,112 | 10/1977 | Vander Hooven et al. | 241/76 X |
| 4,200,486 | 4/1980 | Vagac et al. | 162/8 |
| 4,241,093 | 12/1980 | Farag et al. | 426/258 |
| 4,273,590 | 6/1981 | Cronewitz et al. | 127/44 |
| 4,356,982 | 11/1982 | Nakabayashi et al. | 241/17 |
| 4,451,489 | 5/1984 | Beale et al. | 426/254 |
| 4,502,893 | 3/1985 | Dietrich | 134/10 |
| 4,560,572 | 12/1985 | Watanabe | 99/537 X |
| 4,704,201 | 11/1987 | Keck et al. | 209/17 |
| 4,787,303 | 11/1988 | Papchenko et al. | 99/510 |
| 4,795,653 | 1/1989 | Bommarito et al. | 426/615 |

Primary Examiner—Timothy F. Simone
Attorney, Agent, or Firm—Merchant, Gould, Smith, Edell, Welter & Schmidt

[57] ABSTRACT

A system and corresponding process for cleaning sugarbeet pulp comprising: (a) a tank wherein a sufficient amount of water is added to the pulp to form a first slurry containing about 0.1 to 4 wt-% pulp; (b) a screening apparatus for separating the first slurry into a top portion containing substantially all of the pulp and a bottom portion containing a major proportion of the free foreign material; (c) a mill for reducing the particle size and loosening of adherent foreign material from the pulp; (d) a tank for adding a sufficient amount of water to the top portion to form a second slurry containing about 0.1 to 4 wt-% pulp; (e) a screening apparatus for separating the second slurry into a upper portion containing substantially all of the pulp and a minor proportion of the loosened foreign material and a lower portion containing a major proportion of the loosened foreign material; (f) a tank for adding a sufficient amount of water to the upper portion to form a third slurry containing about 0.1 to 4 wt-% pulp; (g) a screening apparatus for separating the third slurry into a overflow portion containing substantially all of the pulp and an underflow portion containing a major proportion of the minor proportion of loosened foreign material; and (h) a pulp press and thermal dryer for removing water from the sugarbeet pulp to form a dried product having less than about 11 wt-% water.

This system may optionally include a hydrocyclone for removing foreign material from the bottom and lower portions so as to form recyclable water.

36 Claims 24 Drawing Sheets

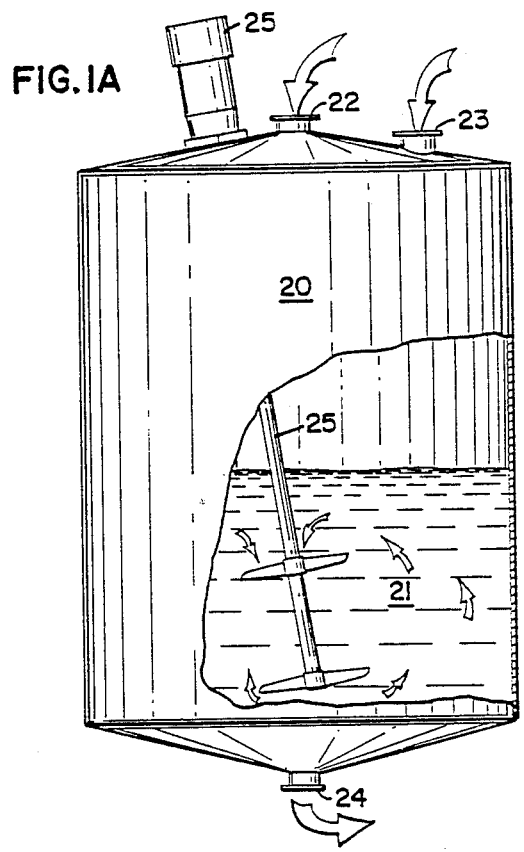
FIG. IA
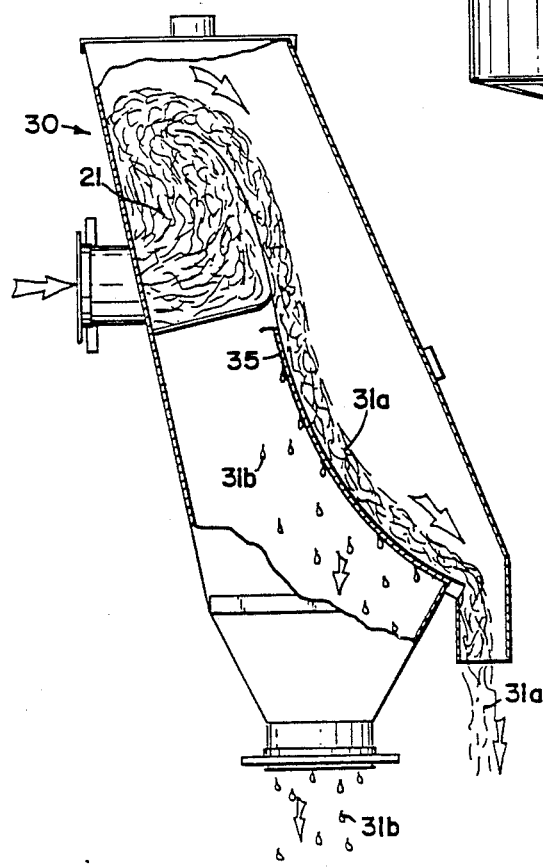
FIG. IB

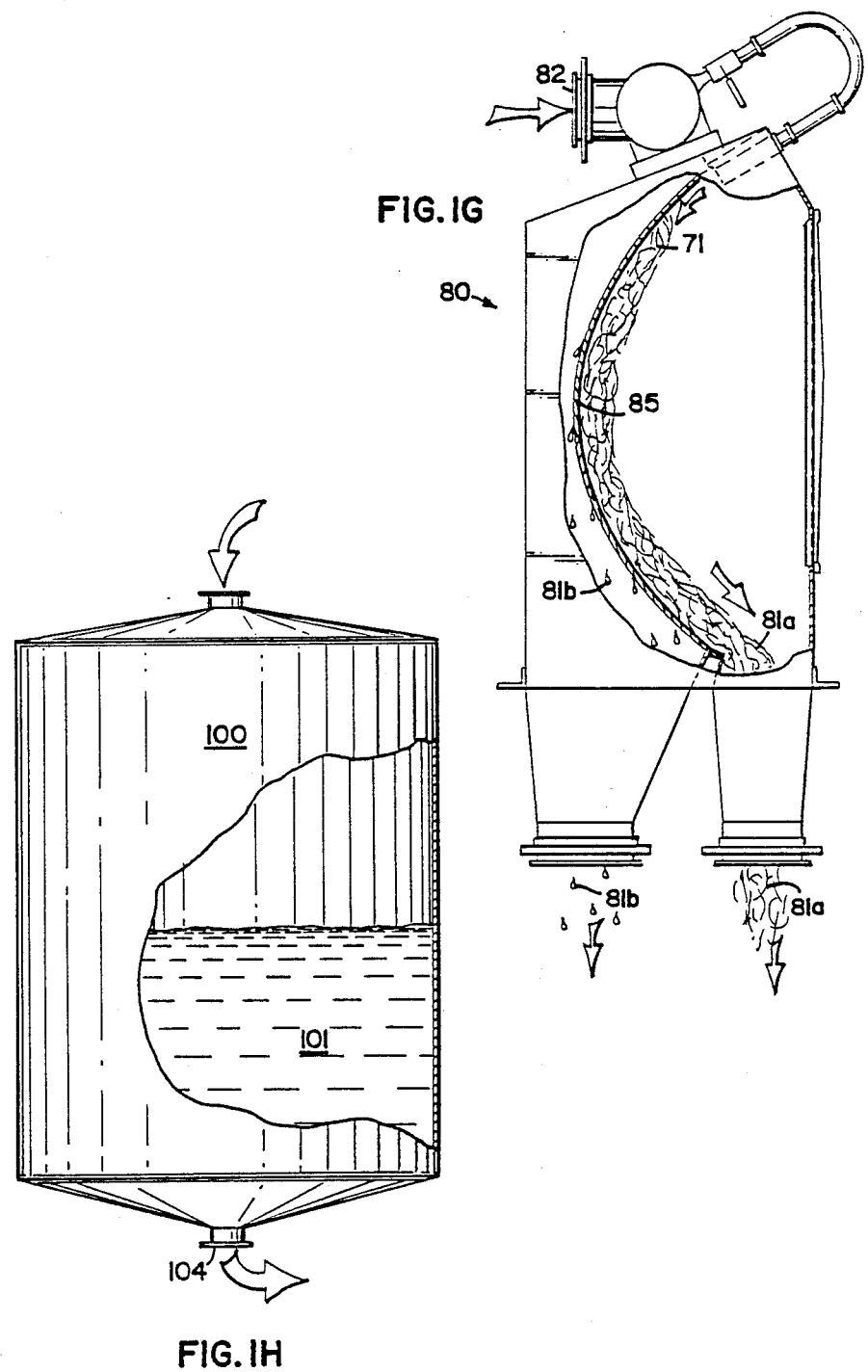

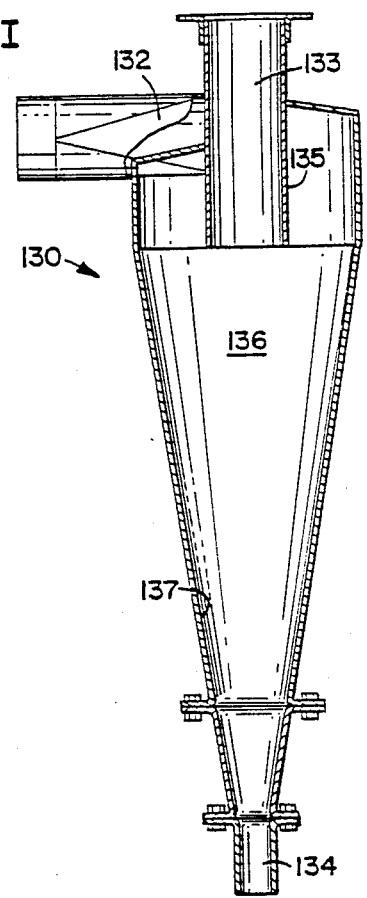
FIG. II
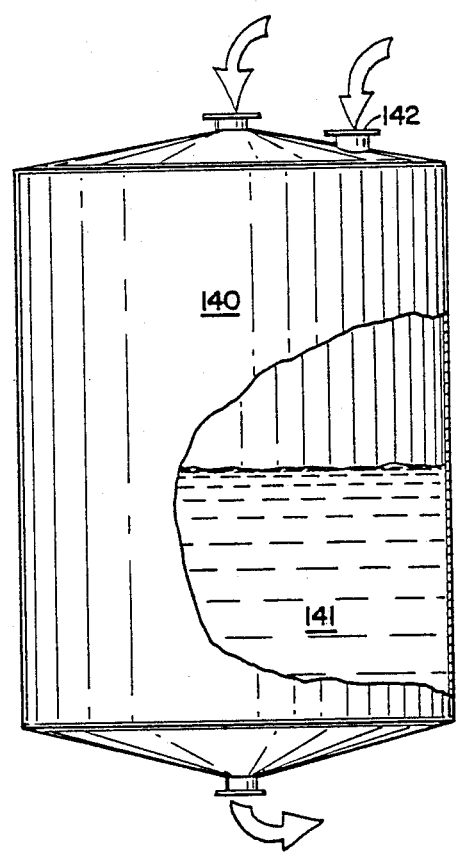
FIG. IJ

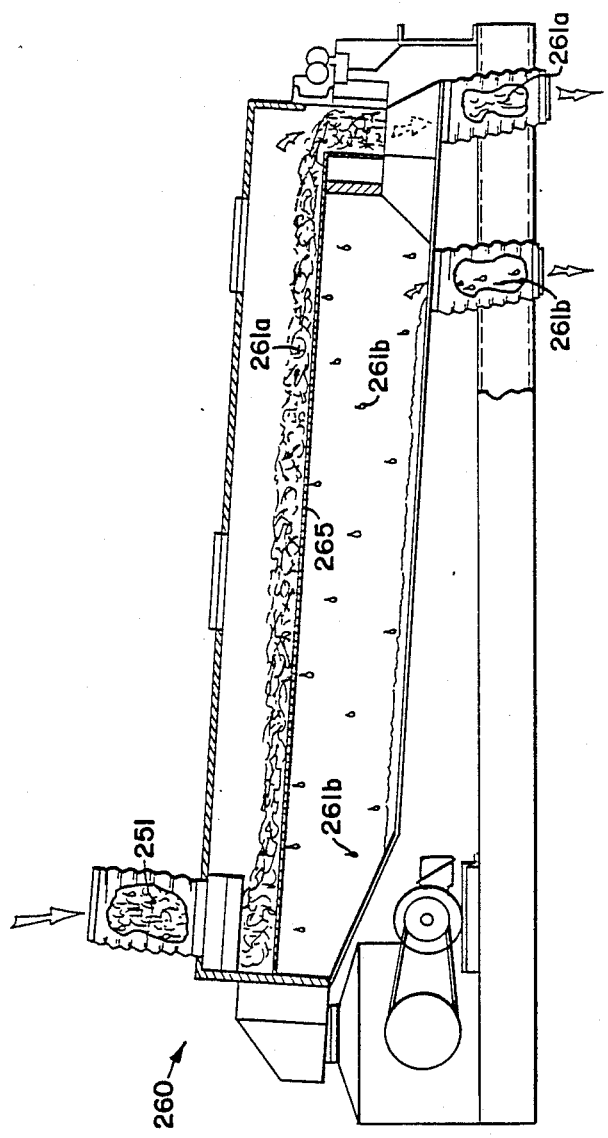

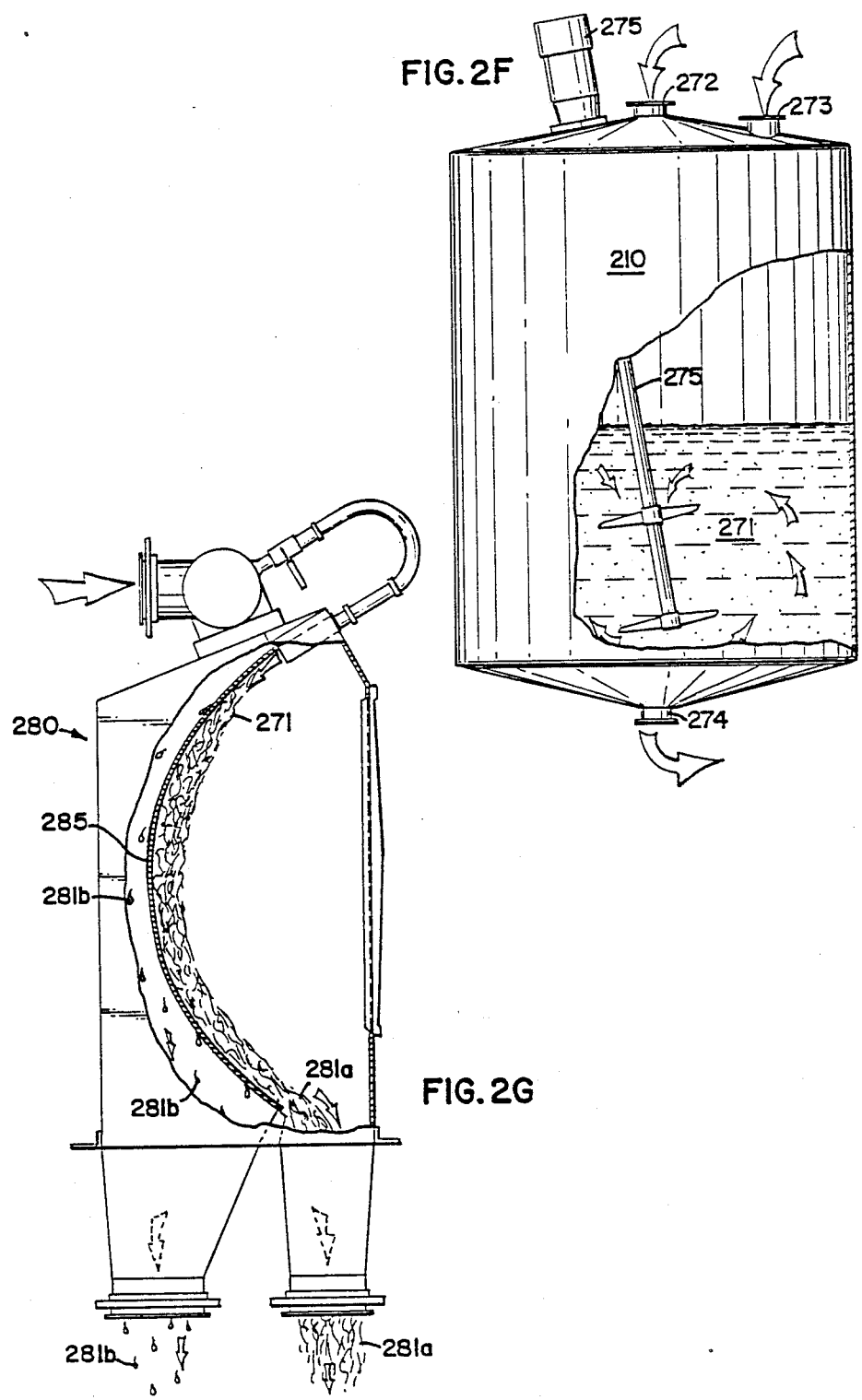

SYSTEM FOR CLEANING SUGARBEET PULP

This is a continuation, of application Ser. No. 07/242,485, filed Sept. 9, 1988, now abandoned, which was a division of application Ser. No. 07/058,364, filed June 4, 1987, now Pat. No. 4,770,886.

FIELD OF THE INVENTION

My invention relates to the washing of vegetable pulp. More specifically, my invention relates to the removal of foreign material from sugarbeet pulp by washing the pulp with water so as to form a human dietary food supplement rich in total dietary fiber.

BACKGROUND OF THE INVENTION

The sugarbeet is a form of the common beet *"Beta vulgaris"* which is commercially grown in large quantities for the sugar contained in the root. While dependant upon the particular species and growing conditions, whole natural sugarbeets typically consist of about 75–80 wt-% water, 14–20 wt-% sugar, 2–10 wt-% pectic material and minor amounts of other components such as amino acids, minerals, etc.

To extract the sugar component a sugarbeet is washed with water to remove foreign material, sliced into a plurality of pieces, commonly called cossettes, to increase the surface area, and contacted with water under conditions sufficient to cause a mass transfer of sugar from the sugarbeet cossettes to the water. The resultant products are a commercially valuable sugar containing juice and sugarbeet pulp.

Typically, the sugarbeet pulp is dried and sold as livestock feed. However, recent advances in the processing of sugarbeets has resulted in sugarbeet pulp suitable for use as a high-fiber human dietary food supplement. This new use of sugarbeet pulp requires that the pulp be substantially free from foreign material and has created a need for a system which can efficiently clean sugarbeet pulp so as to render it fit for human consumption.

SUMMARY OF THE INVENTION

My invention comprises a system for removing free and adherent foreign material from sugarbeet cossettes and sugarbeet pulp comprising: (a) a means for adding an amount of water to the pulp sufficient to form a first slurry containing about 0.1 to 4 wt-% pulp; (b) a means for separating the first slurry into a top portion containing substantially all of the pulp and a bottom portion containing a major proportion of the free foreign material; (c) a means for mechanically treating the pulp in the top portion so as to reduce the particle size of oversized pulp pieces and loosen a substantial proportion of the adherent foreign material from the pulp; (d) a means for adding an amount of water to the top portion sufficient to form a second slurry containing about 0.1 to 4 wt-% pulp; (e) a means for separating the second slurry into an upper portion containing substantially all of the pulp and a minor proportion of the loosened foreign material and a lower portion containing a major proportion of the loosened foreign material; (f) a means for adding an amount of water to the upper portion sufficient to form a third slurry containing about 0.1 to 4 wt-% pulp; (g) a means for separating the third slurry into an overflow portion containing substantially all of the pulp and an underflow portion containing a major proportion of the minor proportion of loosened foreign material; and (h) a means for removing water from the overflow portion to form pulp containing less than about 11 wt-% water. The system may optionally include a means for removing foreign material from the bottom portion and lower portion to form recyclable water.

The resultant dried sugarbeet pulp is fit for human consumption and may be milled to any desired consistency. The milled pulp may be incorporated, to varying degrees, into many food items such as biscuits, bran mixes, breads, breading, hot and cold breakfast cereals, instant breakfast mixes, texturized meats, cakes, cake mixes, candy bars, cookies, corn chips, crackers, croutons, doughnuts, fiber supplement tablets, frosting, fruitcake, granola, granola bars, gravy, gravy mixes, muffins, pancake and waffle mixes, pasta, pastries, pie crusts, pie fillings, potato chips, pretzels, puddings, salad dressings, sauces, sauce mixes, soup, yogurt, etc.

As utilized herein, "substantially all" refers to at least about 70 wt-%.

As utilized herein, "major proportion" refers to at least about 50 wt-%.

As utilized herein, "minor proportion" refers to less than about 50 wt-%.

As utilized herein, "substantial portion" refers to at least about 30 wt-%.

As utilized herein, the term "sugarbeet pulp" refers to sugarbeet from which a substantial proportion of sugar has been extracted.

As utilized herein, the term "free foreign material" refers to all extraneous matter such as clay, rocks, sand, silt, soil, etc. present as separate particles in sugarbeet pulp.

As utilized herien, the term "adherent foreign material" refers to all extraneous matter such as clay, rocks, sand, silt, soil, etc. which are securely coupled to the sugarbeet pulp.

As utilized herein, the term "recycled water" refers to water, previously used to remove foreign material from sugarbeet pulp, which has had an amount of foreign material removed such that the water can effectively remove additional foreign material from sugarbeet pulp.

As utilized herein, the term "screen-size opening" refers to the minimum clear space between the edges of the openings in a screen.

BRIEF DESCRIPTION OF THE DRAWINGS

FIG. 1A is a front view of one embodiment of tank 20 with a portion thereof broken away.

FIG. 1B is a side view of one embodiment of screening apparatus 30 with a portion thereof broken away.

FIG. 1G is a side view of one embodiment of screening apparatus 80 with a portion thereof broken away.

FIG. 1H is a front view of one embodiment of tank 100 with a portion thereof broken away.

FIG. 1I is a cross-sectional front view of one embodiment of separating apparatus 130.

FIG. 1J is a front view of one embodiment of tank 140 with a portion thereof broken away.

FIG. 2E is a side view of one embodiment of screening apparatus 260 with a portion thereof broken away.

FIG. 2F is a front view of one embodiment of tank 270 with a portion thereof broken away.

FIG. 2G is a side view of one embodiment of screening apparatus 280 with a portion thereof broken away.

DETAILED DESCRIPTION OF THE INVENTION INCLUDING A BEST MODE

FIG. 1

Figure 1:
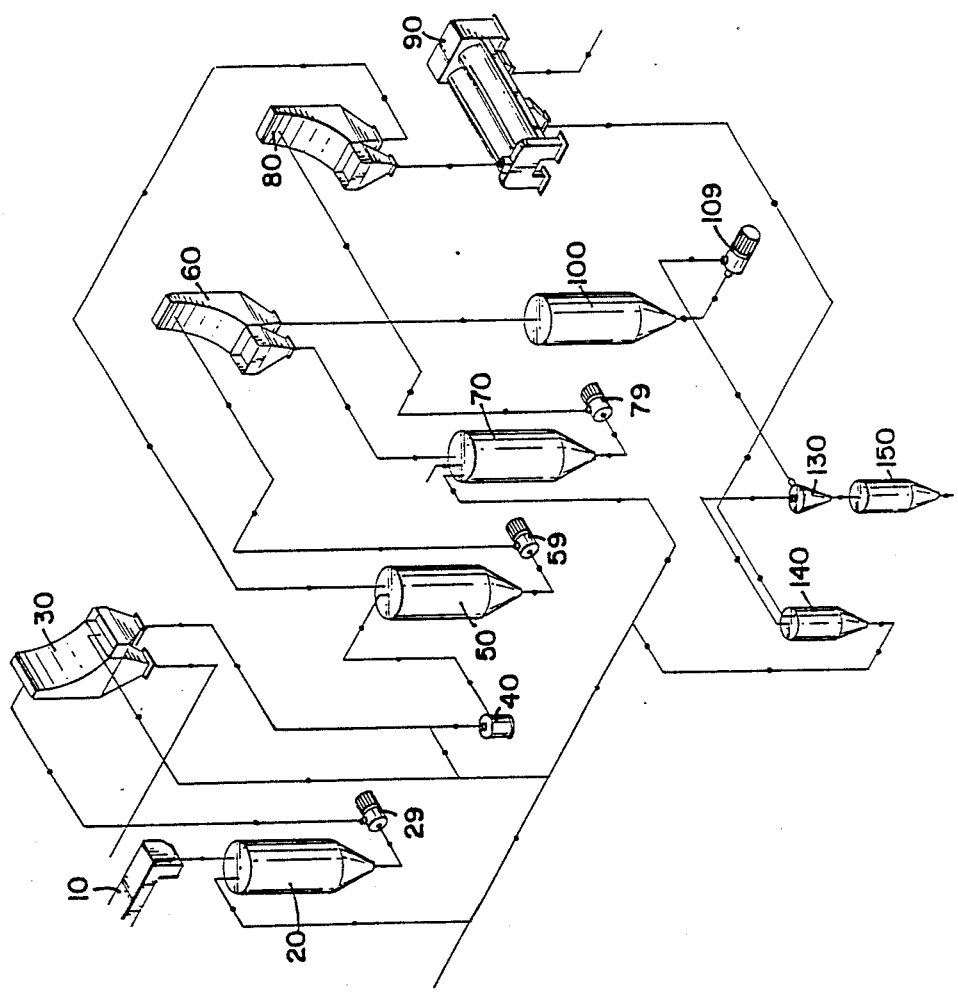
FIG. 1 is a schematic drawing of a first embodiment of the present invention.
Figure 1C:
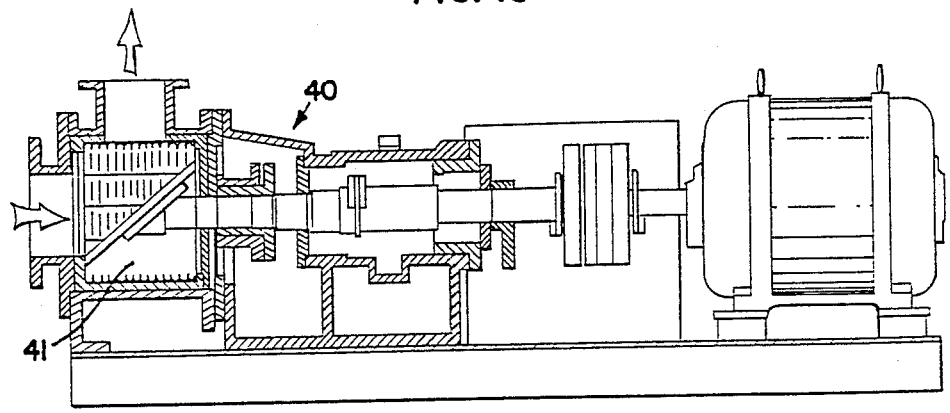
FIG. 1C is a side view of one embodiment of mill 40 with a portion thereof broken away.
Figure 1D:
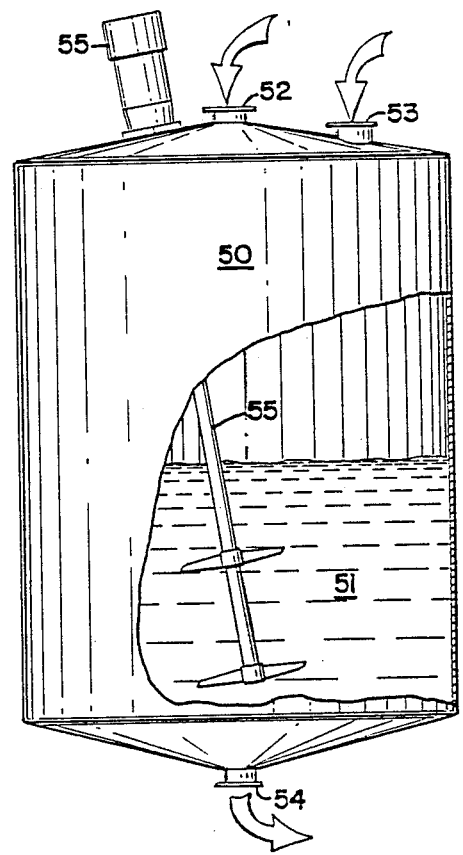
FIG. 1D is a front view of one embodiment of tank 50 with a portion thereof broken away.
Figure 1E:
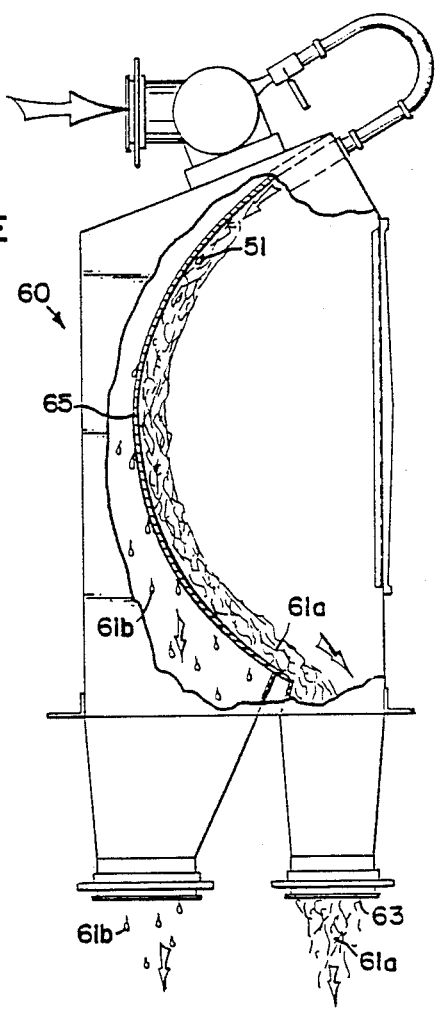
FIG. 1E is a side view of one embodiment of screening apparatus 60 with a portion thereof broken away.
Figure 1F:
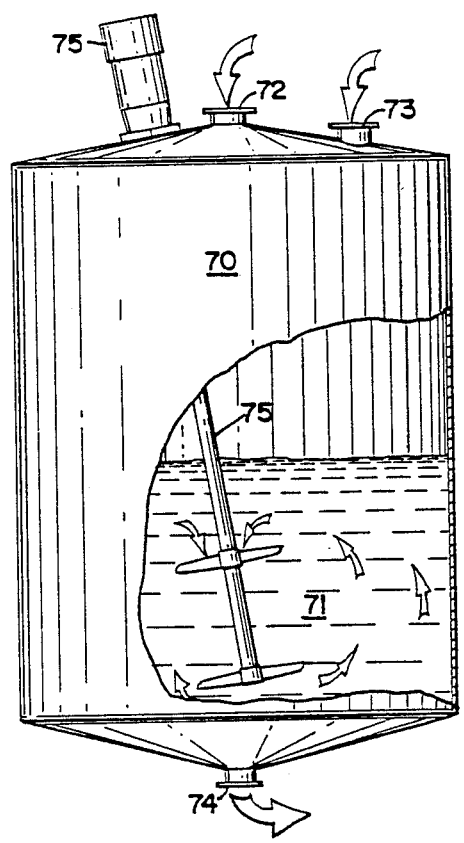
FIG. 1F is a front view of one embodiment of tank 70 with a portion thereof broken away.
Figure 1K:
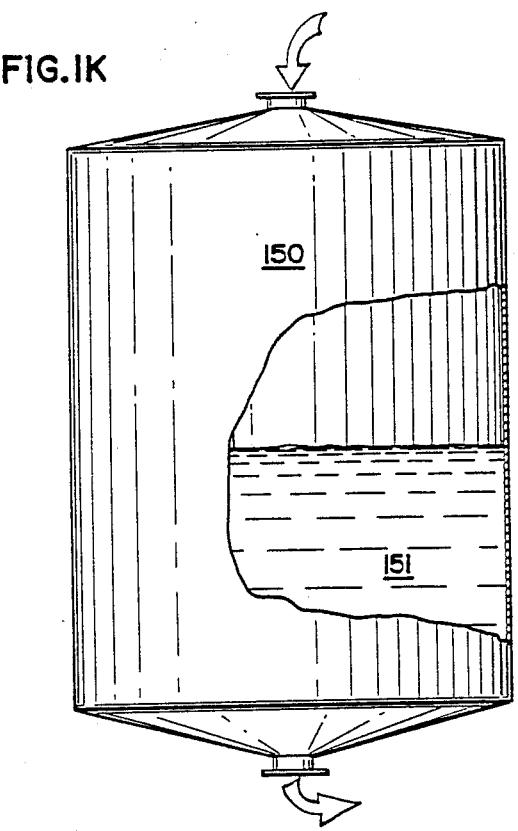
FIG. 1K is a front view of one embodiment of tank 150 with a portion thereof broken away.

Referring generally to FIGS. 1 and 1A-1K, wet sugarbeet pulp from sugarbeet diffuser 10 and sufficient water, preferably recycled water 141 from holding tank 140, are added to tank 20 through a pulp inlet orifice 22 and a water inlet orifice 23 respectively to form a first slurry 21 containing about 0.1 to 4 wt-%, preferably about 1 to 4 wt-%, sugarbeet pulp. The first slurry 21 is agitated in tank 20 by any suitable means, such as an impeller 25, to ensure a uniform slurry. The uniform first slurry 21 is then conveyed by suitable means, such as pump 29, from tank 20, through first slurry outlet orifice 24 to screeing apparatus 30 wherein first slurry 21 is separated into a top portion 31a containing substantially all of the sugarbeet pulp and a bottom portion 31b containing substantially all of the water and a major proportion of the free foreign material. The bottom portion 31b may be discarded or conveyed to recycle tank 100 for recycling but is preferably employed at some other unrelated stage in the sugarbeet processing plant. The top portion 31a is combined with sufficient fresh and/or recycled water 141, preferably recycled water 141 from holding tank 140, to form a flowable slurry 41 which is conveyed to mill 40. In mill 40 the particle size of the sugarbeet pulp in slurry 41 is reduced and a substantial proportion of adherent foreign material loosened from the sugarbeet pulp. The flowable slurry 41 is then conveyed by suitable means from mill 40 into tank 50 through slurry inlet port 52 along with sufficient water, preferably underflow 81b from screening apparatus 80, added through water inlet port 53, to form a second slurry 51 containing about 0.1-4 wt-%, preferably about 0.5-2 wt-%, sugarbeet pulp. The second slurry 51 is agitated in tank 50 by any suitable means, such as impeller 55, to ensure a uniform slurry. The uniform second slurry 51 is then conveyed by suitable means, such as pump 59, from tank 50, through second slurry outlet port 54 and into screening apparatus 60 wherein the second slurry 51 is separated into an upper portion 61a containing substantially all of the disintegrated sugarbeet pulp and a lower portion 61b containing substantially all of the water and a major proportion of the adherent foreign material which has been loosened from the sugarbeet pulp.

The lower portion 61b may be discarded or employed at some other unrelated stage in the sugarbeet processing plant, but is preferably conveyed to recycle tank 100 for recycling. The upper portion 61a is conveyed from screening apparatus 60 through outlet port 63 and into tank 70, through upper portion inlet opening 72 wherein sufficient water, preferably a mixture of recycled water 141 from holding tank 140 and fresh water from an outside source (not shown), are added through water inlet opening 73 to form a third slurry 71 containing about 0.1-4 wt-%, preferably about 0.5-2 wt-%, sugarbeet pulp. The third slurry 71 is agitated in tank 70 by any suitable means such as impeller 75, to ensure a uniform slurry. The uniform third slurry 71 is then conveyed by suitable means, such as pump 79, from tank 70, through third slurry outlet opening 74 and into screening apparatus 80 through inlet opening 82 wherein the third slurry 71 is separated into an overflow portion 81a containing substantially all of the disintegrated sugarbeet pulp and an underflow portion 81b containing substantially all of the water and a major proportion of the remaining loosened adherent foreign material. The underflow portion 81b may be discarded, conveyed to recycle tank 100 or employed at some other unrelated stage in the sugarbeet processing plant, but is preferably conveyed directly to tank 50 through water inle port 53 for formation of the second slurry 51. The overflow portion 81a is conveyed through outlet opening 83 to pulp press 90 for the removal of a substantial portion of the water therefrom. The pressed pulp is then conveyed to a thermal dryer (not shown) for evaporation of sufficient water to form sugarbeet pulp having less than about 11 wt-% water. The water pressed from the sugarbeet pulp in pulp press 90 may be discarded, employed at some other unrelated stage in the sugarbeet processing plant, or conveyed to recycle tank 100 for recycling but is preferably conveyed directly to holding tank 140 through inlet orifice 142 for use as recycled water 141 in the present process.

The water 101 in recycle tank 100 is conveyed from recycle tank 100 through outlet orifice 104 and to a separating means, such as hydrocyclone 130, by suitable means, such as pump 109. The water 101 is separated in hydrocyclone 130 through outlet orifice 104 and to a separating means, such as hydrocyclone 130, into a recyclable portion 141 which is conveyed by suitable means to holding tank 140 from which it can be reused and a waste portion 151, containing substantially all of the foreign material, which is conveyed by suitable means into waste tank 150 through inlet port 152 for temporary storage until it can be disposed of by conventional means.

FIG. 2

Figures 2, 2A:
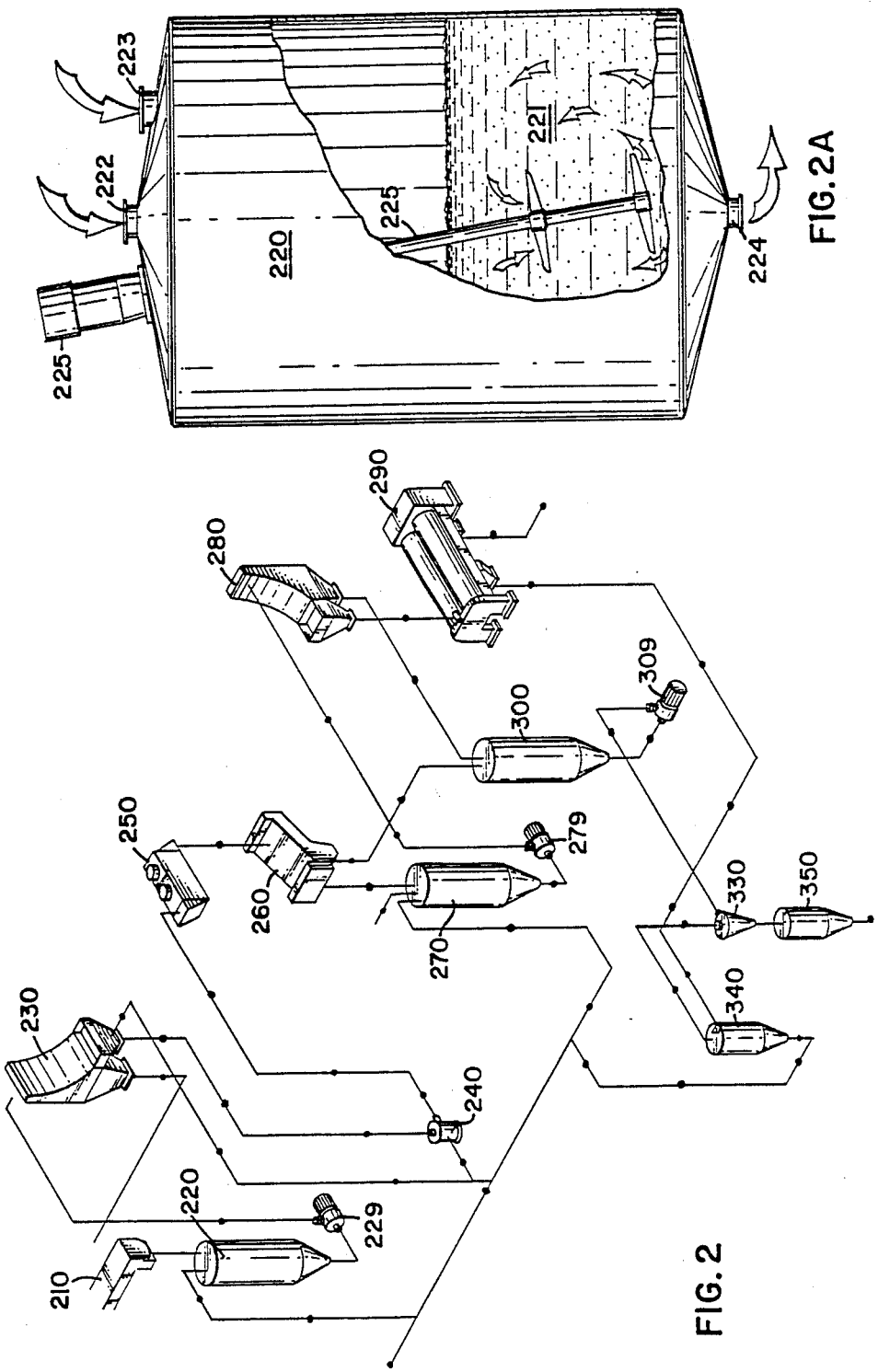
FIG. 2 is a schematic drawing of a second embodiment of the present invention.
FIG. 2A is a front view of one embodiment of tank 220 with a portion thereof broken away.
Figure 2B:
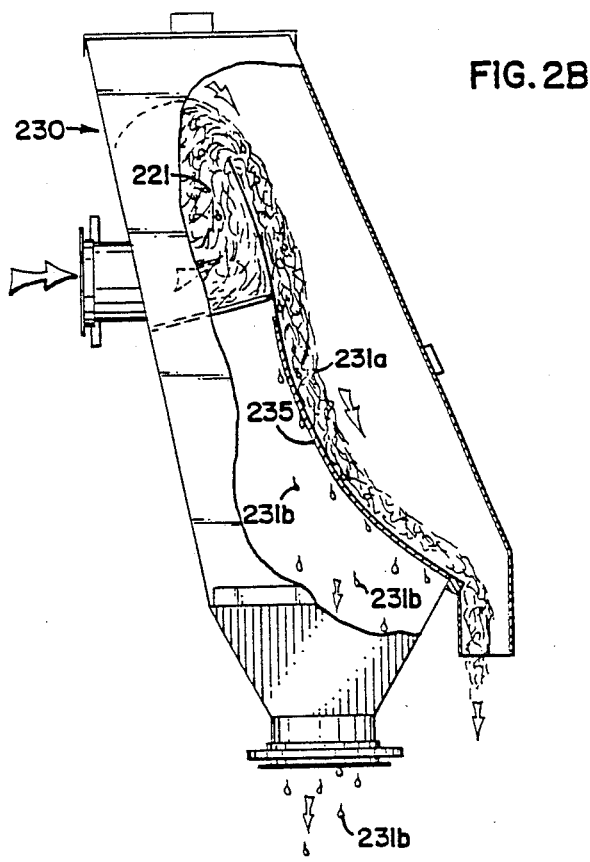
FIG. 2B is a side view of one embodiment of screening apparatus 230 with a portion thereof broken away.
Figure 2C:
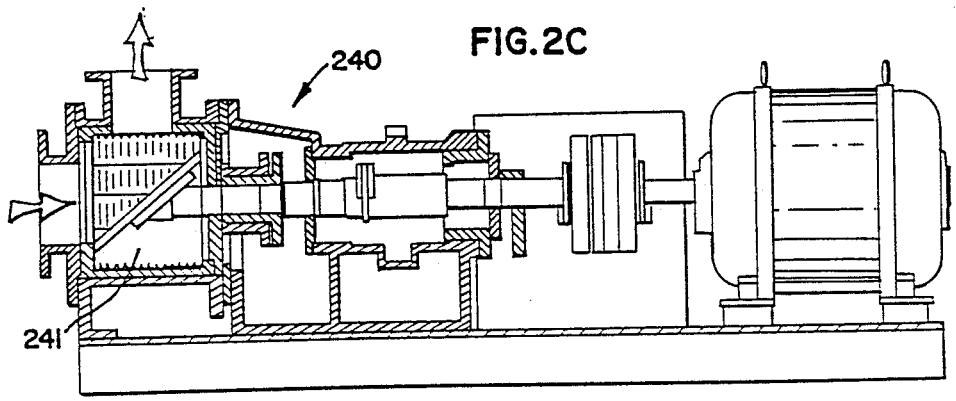
FIG. 2C is a side view of one embodiment of mill 240 with a portion thereof broken away.
Figure 2D:
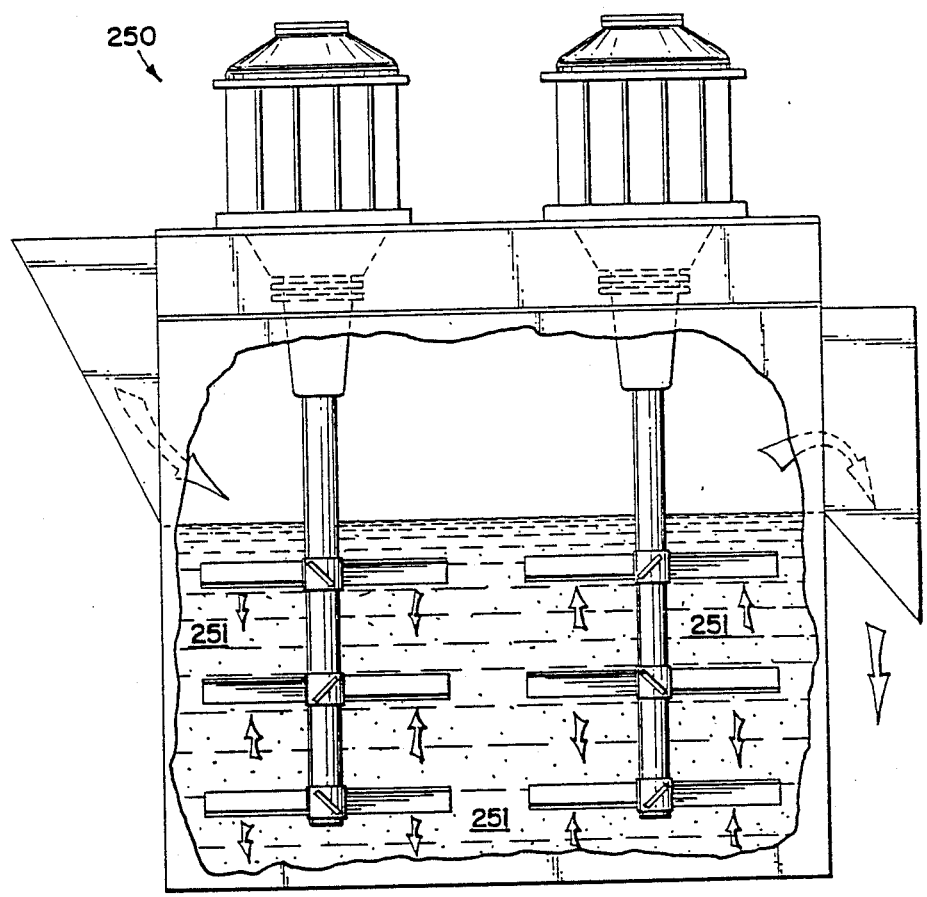
FIG. 2D is a front view of one embodiment of agitator 250 with a portion thereof broken away.
Figure 2H:
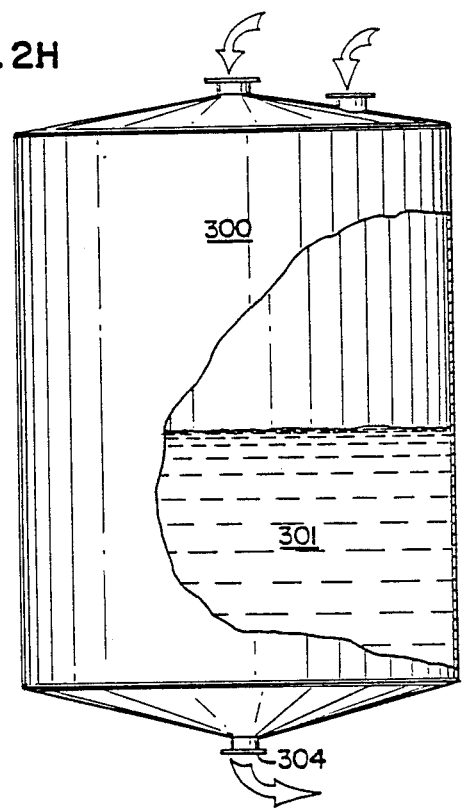
FIG. 2H is a front view of one embodiment of tank 300 with a portion thereof broken away.
Figure 2I:
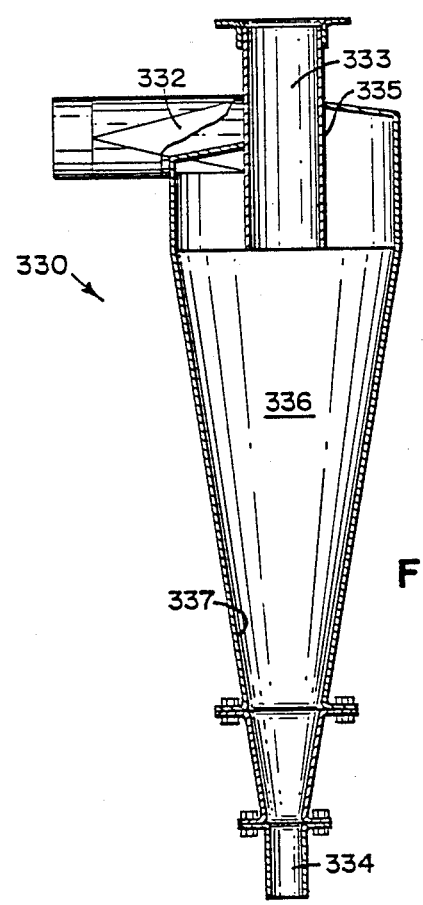
FIG. 2I is a cross-sectional front view of one embodiment of separating apparatus 330.
Figure 2J:
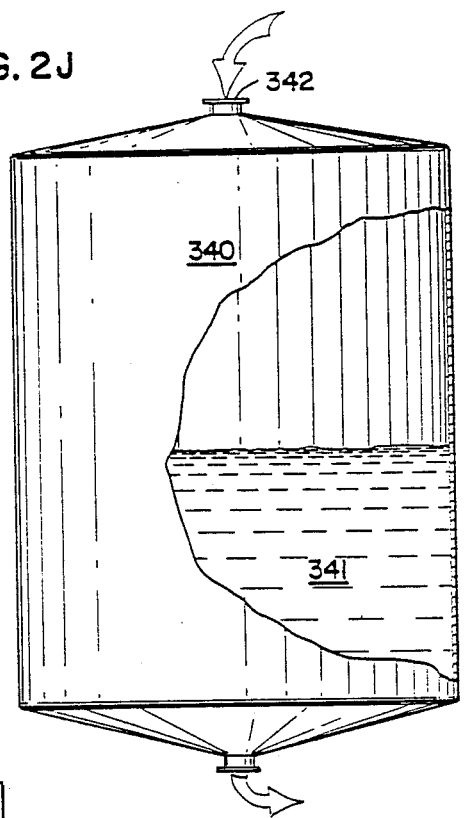
FIG. 2J is a front view of one embodiment of tank 340 with a portion thereof broken away.
Figure 2K:
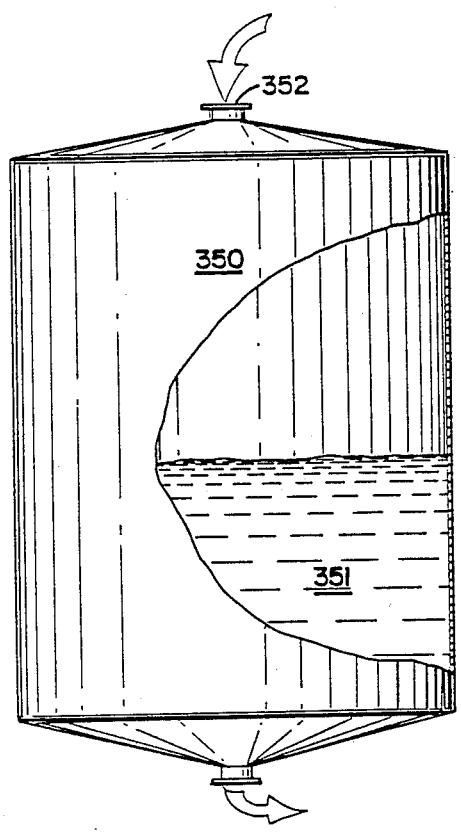
FIG. 2K is a front view of one embodiment of tank 350 with a portion thereof broken away.

Referring generally to FIGS. 2 and 2A-2K, wet sugarbeet pulp from sugarbeet diffuser 210 and sufficient water, preferably recycled water 341 from holding tank 340, are added to tank 220 through a pulp inlet orifice 222 and a water inlet orifice 223 respectively to form a first slurry 221 containing about 0.1 to 4 wt-%, preferably about 1 to 4 wt-%, sugarbeet pulp. The first slurry 221 is agitated in tank 220 by any suitable means, such as an impeller 225, to ensure a uniform slurry. The uniform first slurry 221 is then conveyed by suitable means, such as pump 229, from tank 220, through first slurry outlet orifice 224 to screening apparatus 230 wherein first slurry 221 is separated into a top portion 231a containing substantially all of the sugarbeet pulp and a bottom portion 231b containing substantially all of the water and a major proportion of the free foreign material. The buttom portion 231b may be discarded or conveyed to recycle tank 300 for recycling but is preferably employed at some other unrelated stage in the sugarbeet processing plant. The top portion 231a is combined with sufficient fresh and/or recycled water 341, preferably recycled water 341 from holding tank 340, to form a flowable slurry 241 which is conveyed to mill 240. In mill 240 the particle size of the sugarbeet pulp in slurry 241 is reduced, a substantial proportion of adherent foreign material loosened from the sugarbeet pulp, and sufficient water, preferably recycled water 341 from holding tank 340, is added to the top portion 231a to form a second slurry 251 containing about 0.1–4 wt-%, preferably about 0.5–2 wt-%, sugarbeet pulp. The second slurry 251 is then conveyed, by suitable means, to agitator 250 wherein the second slurry 251 is agitated so as to loosen a substantial portion of the adherent foreign material which is still attached to the pulp after exiting mill 240. The second slurry 251 is then conveyed, by suitable means, to screening apparatus 260 wherein the second slurry 251 is separated into an upper portion 261a containing substantially all of the disintegrated sugarbeet pulp and a lower portion 261b containing substantially all of the water and a major proportion of the foreign material loosened from the sugarbeet pulp by mill 240 and agitator 250.

The lower portion 261b may be discarded or employed at some other unrelated stage in the sugarbeet processing plant, but is preferably conveyed to recycle tank 300 for recycling. The upper portion 261a is conveyed from screening apparatus 260 into tank 270 through upper portion inlet opening 272, wherein sufficient water, preferably a mixture of recycled water 341 from holding tank 340 and fresh water from an outside source (not shown), are added through water inlet opening 273 to form a third slurry 271 containing about 0.1–4 wt-%, preferably about 0.5–2 wt-%, sugarbeet pulp. The third slurry 271 is agitated in tank 270 by any suitable means such as impeller 275, to ensure a uniform slurry. The uniform third slurry 271 is then conveyed by suitable means, such as pump 279, from tank 270, through third slurry outlet opening 274 and into screening apparatus 280 wherein the third slurry 271 is separated into an overflow portion 281a containing substantially all of the disintegrated sugarbeet pulp and an underflow portion 281b containing substantially all of the water and a major proportion of the remaining loosened adherent foreign material. The underflow portion 281b may be discarded or conveyed to recycle tank 300 or employed at some other unrelated stage in the sugarbeet processing plant, but is preferably conveyed directly into tank 250 through water inlet port 253 for formation of the second slurry 251. The overflow portion 281a is conveyed to pulp press 290 for the removal of a substantial portion of the water therefrom. The pressed pulp is then conveyed to a thermal dryer (not shown) for evaporation of sufficient water to form sugarbeet pulp having less than about 11 wt-% water.

The water pressed from the sugarbeet pulp in pulp press 290 may be discarded, employed at some other unrelated stage in the sugarbeet processing plant, or conveyed to recycle tank 300 for recycling, but is preferably conveyed directly to holding tank 340 through inlet orifice 342 for use as recycled water 341 in the present process.

The water 301 in recycle tank 300 is conveyed from recycle tank 300 through outlet orifice 304 and to a separating means, such as hydrocyclone 330, by suitable means, such as pump 309. The water 301 is separated in hydrocyclone 430 into a recycle portion 341 which is conveyed by suitable mans to holding tank 340 through inlet orifice 342 from which it can be recycled back into the present system, and a waste portion 351, containing substantially all of the foreign material, which is conveyed by suitable means into waste tank 350 through inlet port 352 for temporary storage until it can be disposed of by conventional means.

Diffusers 10 and 210 are conventional equipment used in sugarbeet processing plants to extract the sucrose from sugarbeet cossettes by contacting the sugarbeet cossettes with a diffusion liquid, typically water. The diffusion liquid exits the diffuser as a sugar-exhausted juice while the cossettes exit the diffuser as sugar-poor pulp. For a detailed discussion of the function, design, selection and use of sugarbeet diffusers, see McGinnis, *Beet-Sugar Technology*, 3rd Ed., pp. 119–154.

Tanks 20, 220, 50, 70, and 270 respectively, each have at least one water inlet 23, 223, 53, 73 and 273 respectively for allowing the introduction of recycled and/or fresh water; a pulp inlet 22, 222, 52, 72, and 272 respectively, for allowing the introduction of sugarbeet pulp; a means for slurrying the water and pulp retained therein to form a substantially uniform slurry 25, 225, 55, 75 and 275 respectively; and an outlet 24, 224, 54, 74 and 274 respectively, for allowing the discharge of slurry. The water and pulp may be slurried in any convenient manner such as by a rotating impeller, proper placement of the inlets, pneumatic bubbling, etc. For a detailed discussion on the function, design, selection and use of process, storage and agitation vessels, see Perry and Chilton, *Chemical Engineers Handbook*, 5th Ed., pp. 6–85 to 6–89 and pp. 21–4 to 21–10, both sections of which are hereby incorporated by reference.

Tanks 100, 300, 140, 340, 150 and 350 retain water laden with foreign material (100, 300) recyclable water (140, 340), and waste water (150, 350). The function, design, selection and use of these tanks is similar to tanks 20, 220, 50, 70 and 270 as discussed above with the exceptions that an agitation means is unnecessary and pulp is not intentionally added to the tank.

Pumps 29, 229, 59, 79, 279, 109 and 309 convey first slurry (25, 225), second slurry (55), third slurry (75, 275), and water laden with foreign material (105, 305). For a detailed discussion on the function, design, selection and use of pumps, see Perry and Chilton, *Chemical Engineers Handbook*, 5th Ed., pp. 6–3 to 6–36, and Lambeck, Raymond P., *Hydraulic Pumps and Motors*, pp. 7–60, both of which are hereby incorporated by reference.

Screening apparatuses 30, 230, 60, 260, 80, and 280 separate first slurry (30, 230), second slurry (60, 260), and third slurry (80, 280) into two portions, one portion containing substantially all the sugarbeet pulp and a second portion containing substantially all of the water and a major proportion of the free and loosened foreign material in the slurry. To achieve an effective separation between pulp and foreign material, screens 35, 235, and 265 preferably have screen-size openings of about 0.060 to 0.13 inches, with a screen-size opening of about 0.06 to 0.10 inches being most preferred. Screen-size openings smaller than about 0.060 inches tend to significantly increase the amount of foreign material remaining in the sugarbeet pulp while screen-size openings of greater than about 0.13 inches tend to significantly increase the amount of sugarbeet pulp passing through the screen with the foreign material. To achieve an effective separation between pulp and foreign material, screens 65, 85 and 285 preferably have screen-size openings of about 0.006 to 0.02 inches, with a screen-size opening of about 0.006 to 0.01 inches being most preferred. Screen-size openings smaller than about 0.006 tend to significantly increase the amount of foreign material remaining in the sugarbeet pulp while screen-size openings of greater than about 0.02 inches tend to significantly increase the amount of sugarbeet pulp passing through the screen with the foreign material. The screening apparatus may be any of the conventional screens including specifically but not exclusively static screens such as 30, 230, 60, 80 and 280, and vibrating screens such as 260. For a detailed discussion on the functioning, design, selection and use of separating screens, see Perry and Chilton, *Chemical Engineers Handbook*, 5th Ed., pp. 21-39 to 21-45, which is hereby incorporated by reference.

Mills 40 and 240 effect a size reduction of sugarbeet pulp and loosen adherent foreign material from the sugarbeet pulp. One type of mill capable of providing effective size reduction of sugarbeet pulp and loosening of adherent foreign material from the sugarbeet pulp is a disentegrator. For a detailed discussion on the function, design, selection and use of mills, see Perry and Chilton, *Chemical Engineers Handbook*, 5th Ed., pp. 8-35 to 8-42, which is hereby incorporated by reference.

Agitator 250 agitates the second slurry 51 and 251 to loosen adherent foreign material from the disintegrated sugarbeet pulp. The amount of adherent foreign material loosened varies dependent upon, among other factors, dwell time, type of agitator and agitation rate. One type of agitator capable of providing effective loosening of adherent foreign material is the attrition scrubber unit sold by the Denver Equipment Division of Joy Mfg. For a detailed discussion on the function, design, selection and use of agitators, see Perry and Chilton, *Chemical Engineers Handbook*, 5th Ed., pp. 19-3 to 19-23.

Pulp presses 90 and 290 squeeze water from the pulp by mechanically forcing the pulp into continuously smaller volumes. The resultant pressed pulp typically contains from about 65 to 85 wt-% water. The press 90 and 290 commonly employed in sugarbeet plants is the twin screw, horizontal pulp press available from various manufacturers. For a detailed discussion on the function, design, selection and use of pulp presses, see McGinnis, *Beet-Sugar Technology*, 3rd Ed., pp. 625-633 and Perry and Chilton, *Chemical Engineers Handbook*, 5th Ed., pp. 19-101 to 19-104, both of which are hereby incorporated by reference.

Separator 130 and 330 is preferably a cyclone separator. Cyclone separators are a well defined group of devices which can separate a multi-component feedstream into a light fraction and a heavy fraction by subjecting the feedstream to centrifugal force and a pressure gradient. Generally, a cyclone separator is an inverted, right circular frustum of a cone having an outlet 133 and 333 at the top, an outlet 134 and 334 at the bottom, a tangential inlet 132 and 332 near the top and an outlet pipe 135 and 335 extending into the inner cavity 136 of the separator 130 and 330 from the top outlet 133 and 333 to prevent the feedstream from passing directly from the tangential inlet 132 and 332 to the top outlet 133 and 333.

In operation, a multi-component feedstream is introduced into the cyclone separator 130 and 330 through the tangential inlet 132 and 332 whereupon it develops a rotating vortical motion. The vortex thus formed develops a centrifugal force which acts to throw the heavier portion of the feedstream radially toward the sidewall 137 and 337 of the separator 13d. The feed stream follows a downward spiral adjacent the sidewall 137 and 337 of the separator 130 and 330 until it approaches the bottom at which time the lighter portion of the feedstream separates from the heavier portion of the feedstream to form an inner vortex which moves upward, in a tight spiral, through the top outlet 133 and 333 of the cyclone separator 130 and 330. The heavier portion of the feedstream continues spiralling downward until it passes out of the cyclone separator 130 and 330 through the bottom outlet 134 and 334.

A detailed discussion of the function, design, selection and use of cyclone separators may be found in Perry and Chilton, *Chemical Engineers Handbook*, 5th Ed., pp. 20-81 through 20-87.

A major portion of the adherent foreign material is loosened from the pulp by mill 40, 240 and agitator 251. However, significant portions of the adherent foreign material are also loosened by the remainder of the system, in particular tanks 20, 220, 50, 70 and 270.

Since the resultant dried sugarbeet pulp is to be used as a human dietary food supplement, the equipment is preferably constructed of a material which does not taint the flavor of the resultant dried sugarbeet pulp and/or significantly reduces microbial growth in the system. To achieve these ends, the preferred material of construction is stainless steel.

The specification and Drawings are presented to aid in a complete, nonlimiting understanding of the invention. Since many variations and embodiments of the invention can be made without departing from the spirit and scope of the invention, the invention resides in the claims hereinafter appended.

I claim:

1. A system for separating free and adherent foreign material from vegetable pulp comprising:
    (a) a means for adding an amount of water to the pulp sufficient to form a first slurry containing about 0.1 to 4 wt-% pulp;
    (b) a means for separating the first slurry into a top portion containing substantially all of the pulp and a bottom portion containing a major proportion of the free foreign material;
    (c) a means for reducing the particle size of and loosening adherent foreign material from the pulp in the top portion;
    (d) a means for adding an amount of water to the top portion sufficient to form a second slurry containing about 0.1 to 4 wt-% pulp;
    (e) a means for separating the second slurry into an upper portion containing substantially all of the pulp and a minor proportion of the loosened foreign material and a lower portion containing a major proportion of the loosened foreign material;

(f) a means for adding an amount of water to the upper portion sufficient to form a third slurry containing about 0.1 to 4 wt-% pulp;

(g) a means for separating the third slurry into an overflow portion containing substantially all of the pulp and a minor proportion of the loosened foreign material and an underflow portion containing a major proportion of the loosened foreign material; and (h) a means for removing water from the overflow portion to form pulp containing less than about 11 wt-% water.

2. The system of claim 1 further comprising a means for removing foreign material from the bottom portion and lower portion to form recycled water.

3. The system of claim 1 wherein component (a) is in fluid communication with a sugarbeet diffuser for receiving sugarbeet pulp.

4. The system of claim 1 wherein component (a) is a first container having a first container water inlet orifice, a pulp inlet orifice, a means for slurrying the water and pulp in the first container to form the first slurry, and a first slurry outlet orifice.

5. The system of claim 4 wherein the slurrying means is an impeller.

6. The system of claim 2 wherein at least a portion of the water added to the plup to form the first slurry is recycled water.

7. The system of claim 2 wherein all of the water added to the pulp to form the first slurry is recycled water.

8. The system of claim 1 wherein the first slurry separating means is a first screening apparatus having about 0.06 to 0.13 inch screen-size openings.

9. The system of claim 8 wherein the first screening apparatus has about 0.06 to 0.10 inch screen-size openings.

10. The system of claim 8 wherein the first screening apparatus is a static screen.

11. The system of claim 1 wherein the particle size is reduced by a mill.

12. The system of claim 11 wherein the mill is a disintegrator.

13. The system of claim 1 wherein component (d) is a second container having a second container water inlet orifice, a top portion inlet orifice, a means for slurrying the water and top portion in the second container to form the second slurry, and a second slurry outlet orifice.

14. The system of claim 2 wherein at least a portion of the water added to the top portion to form the second slurry is recycled water.

15. The system of claim 1 wherein the second slurry separating means is a second screening apparatus having about 0.006 to 0.02 inch screen-size openings.

16. The system of claim 15 wherein the second screening apparatus is a static screen.

17. The system of claim 1 wherein the second slurry separating means is a second screening apparatus having a vibrating screen with about 0.06 to 0.13 inch screen-size openings.

18. The system of claim 1 wherein component (f) is a third container having a third container water inlet orifice, an upper portion inlet orifice, a means for slurrying the water and the upper portion in the third container to form the third slurry, and a third slurry outlet orifice.

19. The system of claim 2 wherein at least a portion of the water added to the upper portion to form the third slurry is recycled water.

20. The system of claim 18 wherein the slurrying means is an impeller.

21. The system of claim 1 wherein the third slurry separating means is a third screening apparatus having about 0.006 to 0.02 inch screen-size openings.

22. The system of claim 21 wherein the third screening apparatus is a static screen.

23. The system of claim 2 wherein component (h) comprises a press and a thermal dryer in series.

24. The system of claim 23 wherein the press comprises a screw press.

25. The system of claim 23 wherein the water removed from the overflow portion by the press is added to the recycled water.

26. The system of claim 2 wherein means for removing foreign material comprises a hydrocyclone.

27. THe system of claim 2 wherein means for removing foreign material comprises: (i) a tank for collecting and combining the bottom and lower portions into a single source of water, laden with foreign material (ii) a hydrocylcone to separate the water into a substantially foreign material free recyclable portion and a waste portion containing substantially all of the foreign material, and (iii) a tank for retaining the recyclable portion.

28. The system of claim 2 wherein foreign material is removed from the bottom, lower and underflow portions to form recyclable water.

29. A system for separating free and adherent foreign material from sugarbeet pulp, comprising:

(a) a first container in fluid communication with a source of pressurized water for supplying water to the first container and a diffuser sugarbeet pulp discharge port for supplying sugarbeet pulp to the first container; the first container having a means for slurrying the water and sugarbeet pulp supplied thereto so as to form a first slurry containing about 0.1 to 4 wt-% sugarbeet pulp and a first slurry outlet orifice;

(b) a first screening apparatus having about 0.06 to 0.13 inch screen-size openings for separating the first slurry into a top portion containing substantially all of the sugarbeet pulp and a bottom portion containing a major proportion of the free foreign material;

(c) a mill for reducing the particle size of the sugarbeet pulp in the top portion and loosening adherent foreign material from the sugarbeet pulp;

(d) a second container in fluid communication with a source of pressurized water for supplying water to the second container and with the mill for supplying the top portion to the second container; the second container having a means for slurrying the water and top portion supplied thereto so as to form a second slurry containing about 0.1 to 4 wt-% sugarbeet pulp and a second slurry outlet orifice;

(e) a second screening apparatus having about 0.006 to 0.02 inch screen-size openings for separating the second slurry into an upper portion containing substantially all of the sugarbeet pulp and a minor proportion of loosened foreign material and a lower portion containing a major proportion of the loosened foreign material;

(f) a third container in fluid communication with a source of pressurized water for supplying water to the third container, and the second screening apparatus for supplying the upper portion to the third container; the third container having a means for slurrying the water and upper portion supplied thereto so as to form a third slurry containing about 0.1 to 4 wt-% sugarbeet pulp and a third slurry outlet orifice;

(g) a third screening apparatus having about 0.006 to 0.02 inch screen-size openings for separating the third slurry into an overflow portion containing substantially all of the sugarbeet pulp and an overflow portion containing a major proportion of the minor proportion of the loosened foreign material;

(h) a screw press for removing water from the overflow portion;

(i) a tank for collecting the bottom and lower portions so as to form a single source of water; laden with foreign material;

(j) a hydrocyclone to separate the water laden with foreign material into a substantially free, recycle portion and a waste portion containing substantially all foreign material in the water; and (k) a vessel for retaining the recycle portion.

30. A system for cleaning vegetable pulp containing adherent foreign material comprising:

a. means for loosening a proportion of the adherent foreign material from the vegetable pulp;

b. means for obtaining an aqueous separation of the vegetable pulp and a proportion of the loosened foreign material; and c. means for physically separating the vegetable pulp from a proportion of the loosened foreign material.

31. The system of claim 30 wherein the loosening means reduces the particle size of the pulp.

32. The system of claim 30 wherein the means for obtaining an aqueous separation is a container equipped to combine and agitate the vegetable pulp and the loosened foreign material with water.

33. The system of claim 30 wherein the physical separating means is a screening apparatus.

34. The system of claim 30 further comprising:

(a) means for obtaining an aqueous separation of the physically separated vegetable pulp and a proportion of any remaining loosened foreign material; and (b) means for physically separating the vegetable pulp from a proportion of the remaining loosened foreign material.

35. The system of claim 34 wherein the means for obtaining an aqueous separation is a container equipped to combine and agitate the vegetable pulp and the remaining loosened foreign material with water.

36. The system of claim 34 wherein the physical separating means is a screening apparatus.

* * * * *